United States Patent
Griffin, Jr.

(10) Patent No.: US 8,115,451 B2
(45) Date of Patent: Feb. 14, 2012

(54) MULTIPLE DEVICE CHARGING STATION WITH USER FRIENDLY CONFIGURABLE MOUNT

(75) Inventor: Paul P. Griffin, Jr., Nashville, TN (US)

(73) Assignee: Griffin Technology, Inc., Nashville, TN (US)

( * ) Notice: Subject to any disclaimer, the term of this patent is extended or adjusted under 35 U.S.C. 154(b) by 931 days.

(21) Appl. No.: 12/128,494

(22) Filed: May 28, 2008

(65) Prior Publication Data

US 2009/0295328 A1    Dec. 3, 2009

(51) Int. Cl.
*H02J 7/00* (2006.01)
(52) U.S. Cl. .................. 320/115; 320/107
(58) Field of Classification Search ........... 320/107, 320/113, 115, 116; 455/573
See application file for complete search history.

(56) References Cited

U.S. PATENT DOCUMENTS

| | | | |
|---|---|---|---|
| 6,049,192 A * | 4/2000 | Kfoury et al. | 320/113 |
| 6,524,240 B1 * | 2/2003 | Thede | 600/300 |
| 7,627,343 B2 * | 12/2009 | Fadell et al. | 455/557 |
| 7,944,182 B2 * | 5/2011 | Beg et al. | 320/162 |
| 2002/0115480 A1 * | 8/2002 | Huang | 455/573 |

* cited by examiner

*Primary Examiner* — Edward Tso
*Assistant Examiner* — Aaron Piggush
(74) *Attorney, Agent, or Firm* — Hornkohl Intellectual Property Law, PLLC; Jason L. Hornkohl

(57) ABSTRACT

A power supply for charging multiple devices that can be adapted to receive and charge practically any type of portable electronic device includes a base that receives an AC wall voltage and converts the wall voltage to DC voltage. The base includes at least two docking cavities that can simultaneously, physically and electrically couple the base to two portable electronic devices such that the devices are supported by the dock while they are being charged. The devices are supported so that there displays are visible and their controls are accessible. Adapters can also be inserted into the docking cavities to reconfigure the cavity to physically support a different type of device.

16 Claims, 4 Drawing Sheets

MULTIPLE DEVICE CHARGING STATION WITH USER FRIENDLY CONFIGURABLE MOUNT

CROSS-REFERENCES TO RELATED APPLICATIONS

None.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

Portable electronic devices are increasingly common in modern society. Each of these portable devices has a rechargeable power supply that requires a corresponding power supply charger that conditions power received from a wall outlet to the voltage and current parameters required for the particular type of device. As the number of devices increases, users have to maintain an increasing number of chargers to satisfy the requirements of their multiplying devices. Each charger typically consists of a 120 volt plug attached to transformer and an AC to DC voltage converter that produces the appropriate DC voltage for charging the particular type of electronic device and a device specific connector configured to couple to the device for which the charger is designed. The charger may also contain a physical mount or dock that supports or mounts the device while it is charging it. Since many of these types of chargers are similar in appearance, a user will often confuse the chargers and bring the wrong one or have to try various chargers before locating the appropriate one to charge a particular device. In addition, since a charger is typically designed for a particular device, a user will usually discard the charger when the device's useful life ends, even though the charger is perfectly capable of charging another device owned by the user.

Chargers for multiple devices such that that described in U.S. Pat. No. 4,739,242 are known. However, devices such as these do not support the products such that they can be used while they are being charged and are limited in that each charging station is permanently configured for a particular type of device. In addition, the devices are weakly supported and tend to disengage from the charger coupling.

The marketing and selling of power supplies also presents many obstacles. Consumers are typically ill informed about the details of chargers and don't want to have to locate a separate charger when purchasing a device. Thus, chargers are typically included with a device. When the device is no longer needed, the charger is discarded. However, due to the simplicity and overall durability of the basic components of power supplies, the power supply is typically still fully functional when the device is no longer usable and contains many of the same the basic components as the new charger that will be provided to the purchaser when they purchase a new device. Furthermore, since the manufacturers know that the chargers will be discarded before their components fail; there is little incentive to use high quality durable components in chargers.

In light of the problems discussed above, what is needed is an improved charger that can support and accept a large variety of different devices and accommodate new devices as they are developed.

BRIEF SUMMARY OF THE INVENTION

The present invention is directed toward a charger for charging a plurality of electronic devices. The charger includes at least two docks. Each dock is adapted to receive a first type of portable electronic device having a display and user controls such that an electrical connector in the dock is electrically coupled to an electrical connector of the portable electronic device and a rechargeable power supply of the device is charged. The docks support the devices so that the display of the device can be viewed and the user controls accessed while the device is charging. Each dock can be reconfigured to receive a second portable electronic device having different dimensions than the first portable electronic device with a dock adapter that alters an internal dimension of the docking station. In addition, a dock adapter having an input connector that can be coupled to the connector in the docking station and an output connector that is adapted to connector to a different type of connector than the input connector can be used to accommodate devices having different connectors. The adapter may also include a voltage converter for converting a first DC voltage to a second DC voltage. An FM transmitter can be included in the base to receive an output signal from a device coupled to one of the docking stations and produce an FM broadcast signal based upon the output signal. In such an embodiment, a display may be included for displaying a transmit frequency and user inputs that allow a user to alter the transmit frequency.

Another embodiment of the present invention is directed toward a charging dock for charging up to four portable electronic devices. The charging dock includes four docking stations. Each station is adapted to mount and hold a portable electronic device in an upright position such that a display of the device is visible while the charging dock is charging a power supply of the device. Each docking station can be configured to accept at least two different types of portable electronic devices including a digital media player. The docking stations have a cavity and a unitary plastic insert is positioned into the cavity to configure the cavity to accept a different type of portable electronic device. The insert may also include a first connector for electrically connecting to the connector in the cavity and a second connector for electrically connecting to a different type of device than the connector in the cavity. A rechargeable battery is mounted in the charging dock that is charged when the charging dock is connected to an external power supply such that the charging dock can be used to charge a device when the charging dock is not connected to the external power supply.

DETAILED DESCRIPTION OF THE INVENTION

Figure 1:
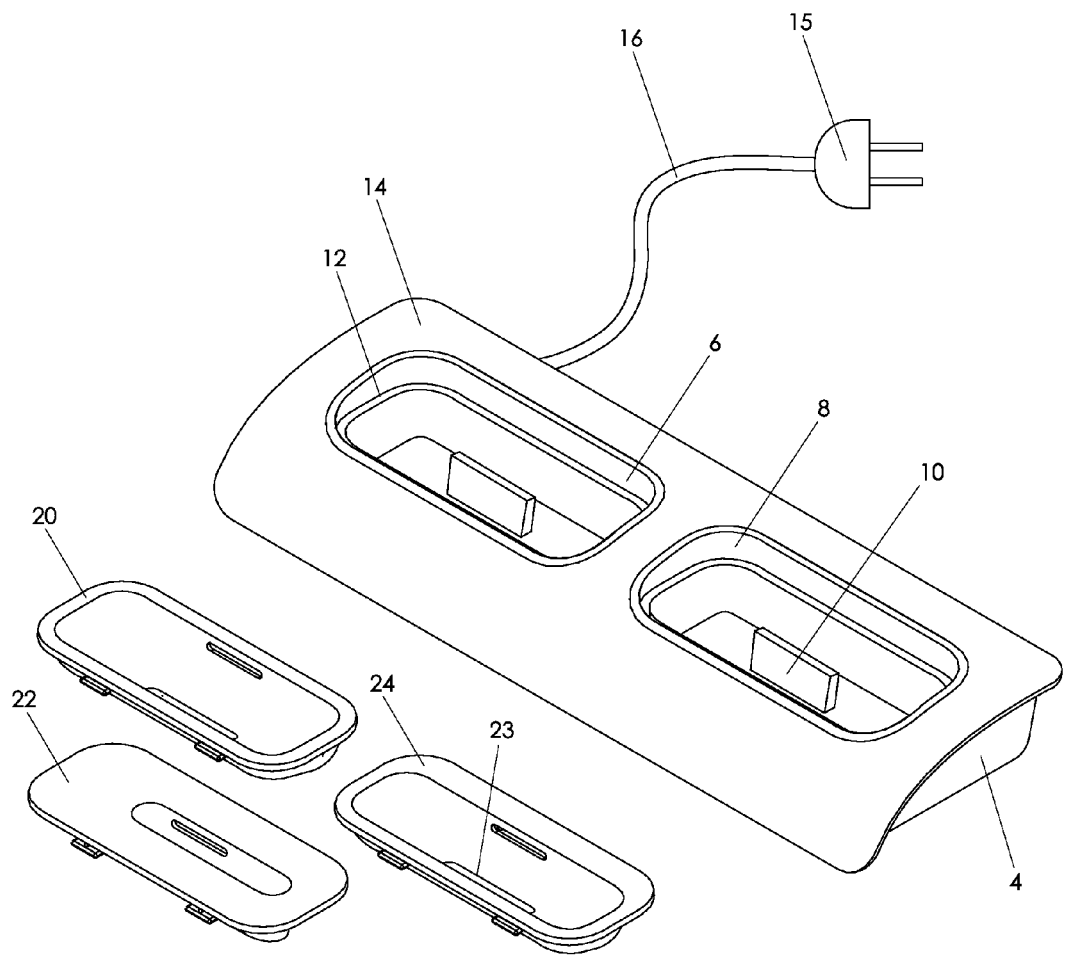
FIG. 1 is an illustration of an embodiment of the present invention having two docking stations.

An illustration of a multiple dock charging accessory 2 constructed in accordance with an embodiment of the present invention is shown in FIG. 1. The accessory has a main body portion 4 with two docking stations 6 and 8. Each docking station has a connector 10 that is adapted to physically and electrically connect a portable electronic device to the main body portion 4. A supportive inner cavity 12 is formed in the upper surface 14 of the main body portion 4. The main body portion 4 contains internal voltage conditioning circuitry that receives electrical power through a household plug 15 and cable 16 and converts the electrical power into the voltage and current required by the devices for which the connectors 10 in the docking stations 6 and 8 are designed. In the embodiment shown, the docking stations contain 30 pin connectors 10 adapted to couple to a digital media player such as an Apple iPod. However, alternative types of connectors can be used if desired.

Adapters 20, 22 and 24 allow a user to customize the accessory 2 to accept the particular type of devices that they need to charge. The adapters are preferably constructed from a unitary piece of plastic. The adapters 20, 22 and 24 can be inserted into the docking stations 6 and 8 to configure the stations to receive the different types of portable electronic device. The adapters 20, 22 and 24 alter the inner dimensions of the cavity 12 so that devices of different sizes and shapes can be securely held by the cavity 12. Holes 23 in the adapters 20, 22 and 24 allow the connectors 10 to be coupled to a corresponding connector on a device being charged through the adapter.

Figure 2:
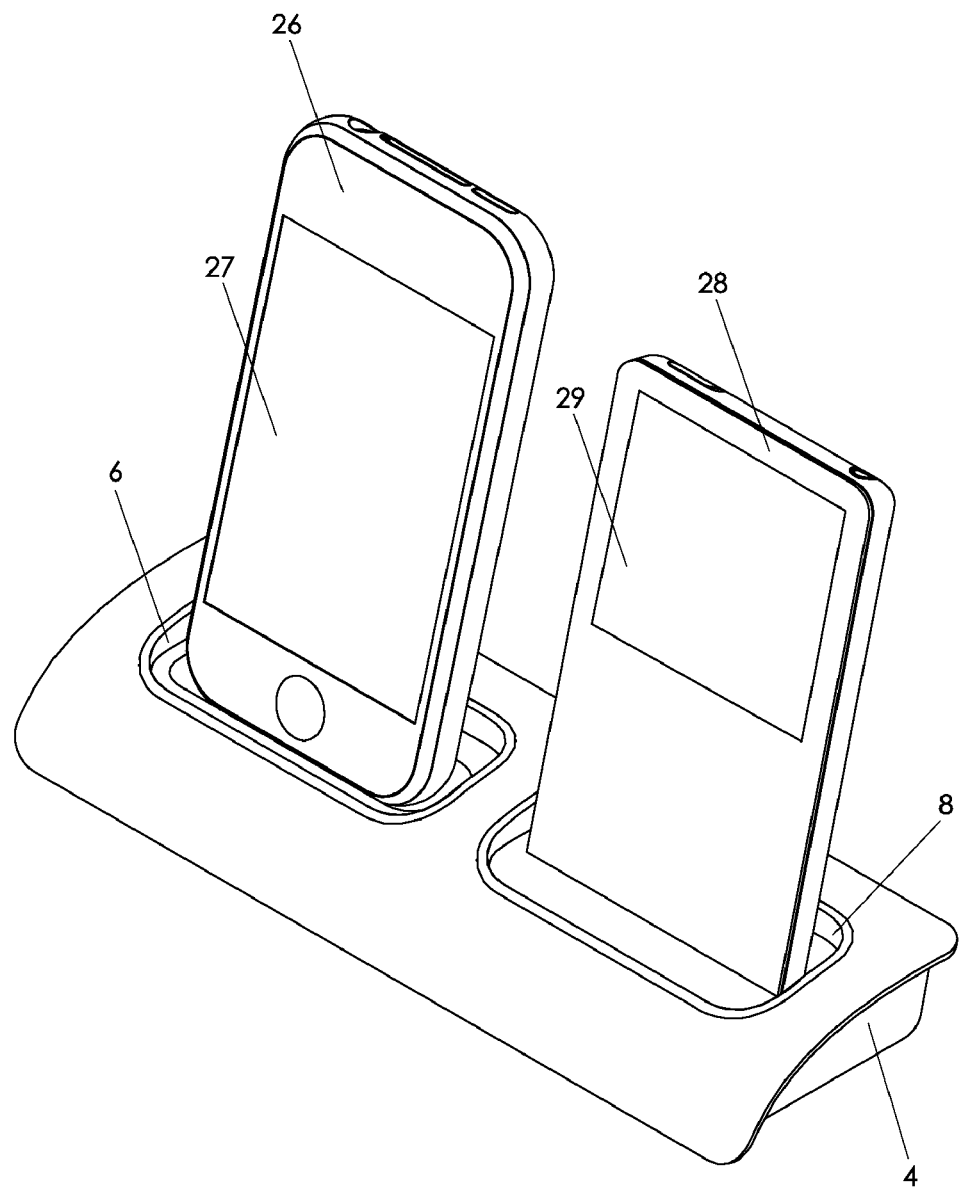
FIG. 2 is an illustration of an embodiment of the present invention having two docking stations with devices mounted in the docking stations.

As shown in FIG. 2, the devices 26 and 28 are supported in an upright fashion on the main body 4 such that the display and controls 27 and 29 of the devices are easily accessible. This is particularly important for mobile phones and digital media players that often need charging while they are being used. In addition, the upright mounting posture allows individual users to more easily identify their particular device when it is mounted near a similar type of device. The adapters allow the chamber to be reconfigured so that even if a device has different dimensions, it can be firmly supported in an upright position when mounted in the cavity.

Figure 3:
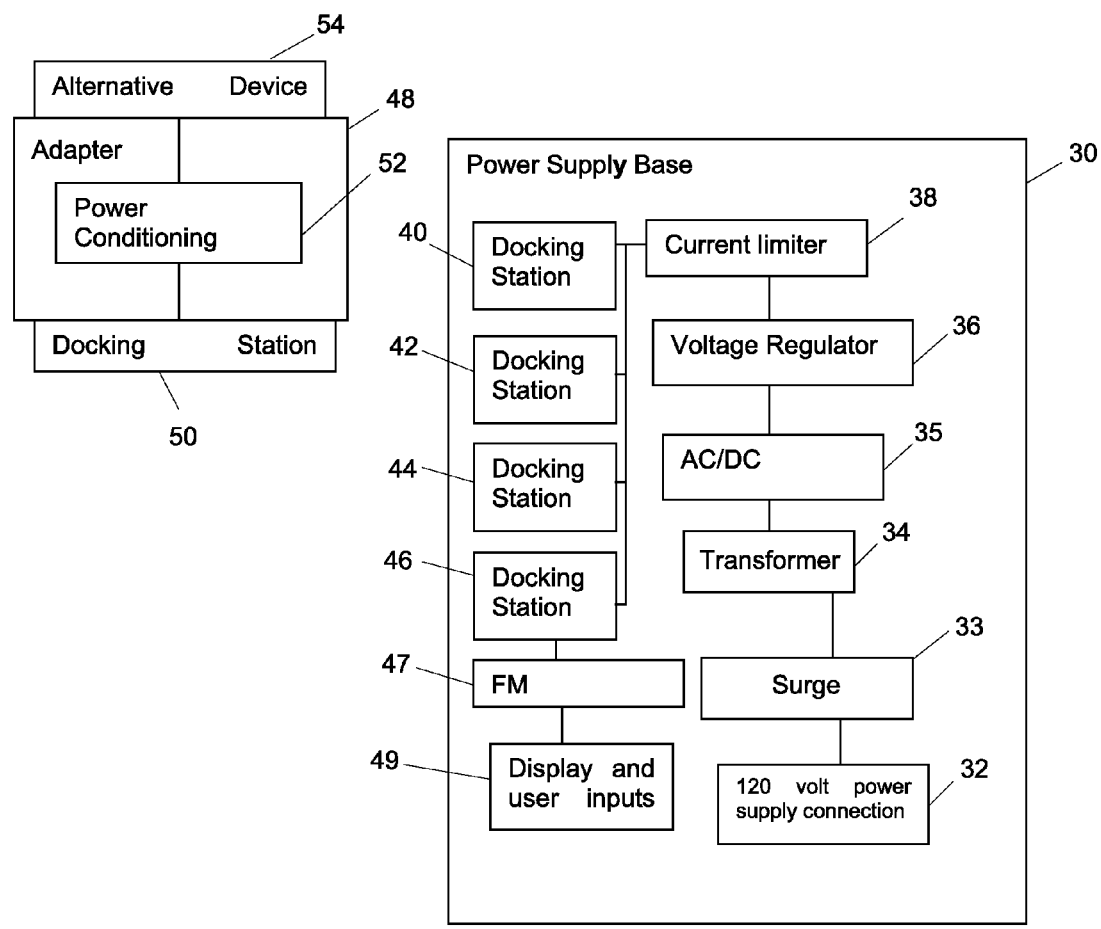
FIG. 3 is a block diagram of an embodiment of the present invention.

Referring now to FIG. 3, a block diagram of an embodiment of the present invention is shown. The charging accessory 30 has a 120 volt AC power supply connection 32 such as a standard plug and cord. A surge protector 33 coupled to the power supply connection 32 prevents power surges from the power supply connection 32 from damaging the accessories 30 internal circuitry. A transformer 33 receives the AC voltage from the surge protector 33 and converts the 120 V AC voltage to a lower AC voltage. An AC to DC converter 35 converts the lowered AC voltage power into a DC voltage. A separate voltage regulator 36 can be included to set the DC voltage to the desired voltage. Alternatively, the AC to DC converter 35 can simply be selected to output the desired voltage. A DC voltage of 24 volts is preferred since this is the maximum DC voltage commonly used and it can be easily stepped down to a lower DC voltage for any device that requires it with a simple passive circuit. A current limiter 38 limits the current to prevent damaging the devices being charged or creating hazardous shorting conditions.

The output from the current limiter is provided to each of the docking stations 40, 42, 44 and 46. Each docking station has a connector adapted to mate with the particular device to be charged. The charging voltage from the current limiter 38 is electrically coupled to an appropriate electrical contact on the connector to charge the device when the device is docked in the docking station 40, 42, 44 and 46.

An adapter 48 is provided that has a docking interface 50 that is adapted to electrically and physically couple to one of the docking stations 40, 42, 44 and 46. The adapter 48 contains power conditioning circuitry 52 that alters the output voltage of the docking station 40, 42 44 and 46 to which it is coupled to a second output DC voltage level required by a portable device for which the adapter 48 is designed. The power conditioning circuitry 52 provides the proper output voltage and current to an alternative device dock 54 that is adapted to couple to the device for which the adapter 48 is designed. The adapter 48 connects to a docking station 40, 42, 44 and 46 to configure the docking station to accept the alternative type of electronic device. Thus, a proper set of adapters allow a user to configure the charger to accept the particular types of devices that they own. The adapters 48 can preferably be purchased separately such that a consumer can only purchase the particular adapters that they require.

An FM transmitter 47 is coupled to one dock 46 such that an audio signal can be received from a portable electronic device mounted in the dock 46 and broadcast by the FM transmitter 47 to a remote receiver. This allows a user to listen to their digital music player while it is charging over the home stereo receiver. A display and user inputs 49 are provided such that the user can select the desired frequency for the transmitter.

Figure 4:
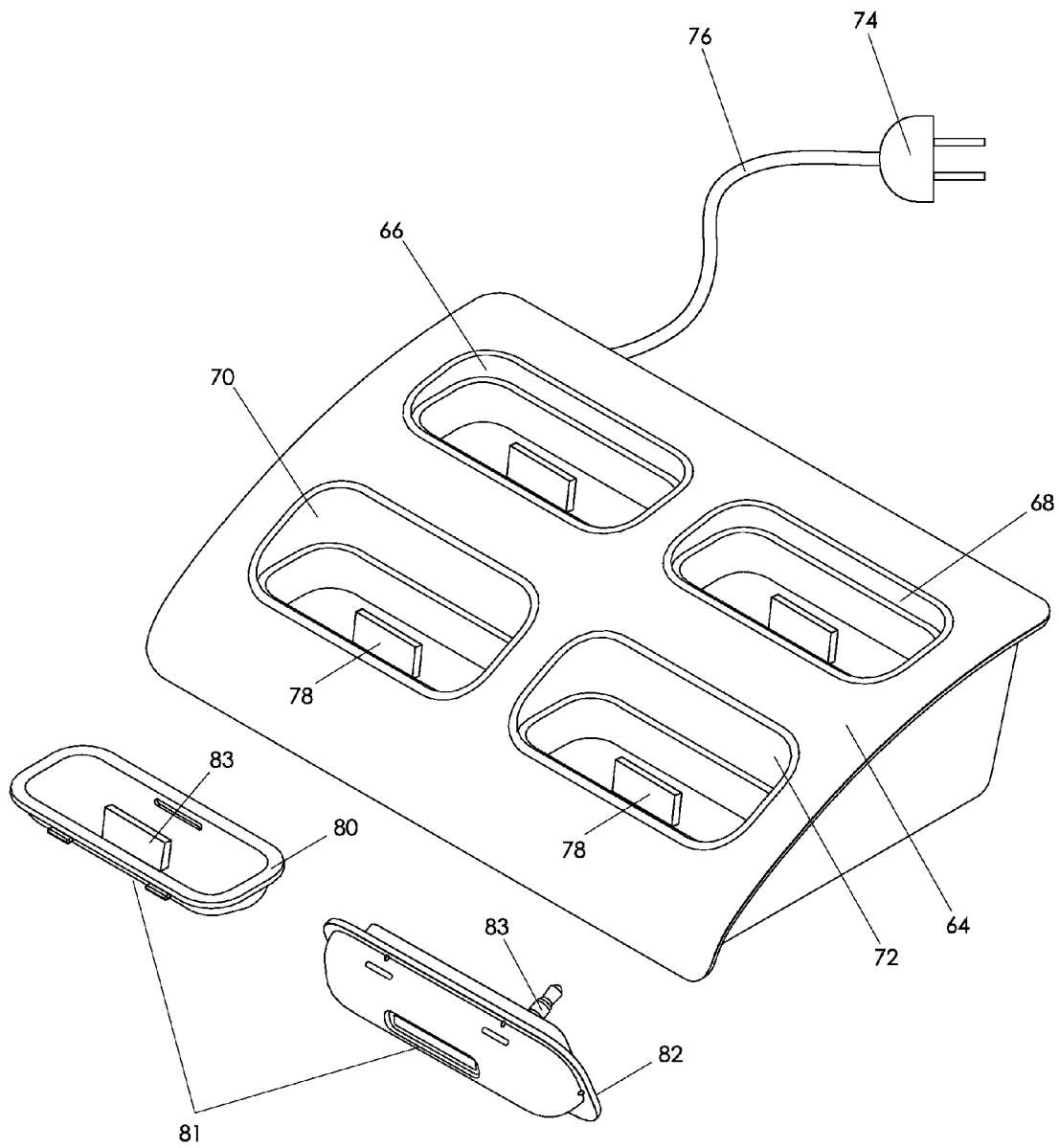
FIG. 4 is an illustration of an embodiment of the present invention having four docking stations.

An illustration of a multiple dock charging accessory 62 constructed in accordance with an embodiment of the present invention is shown in FIG. 4. The accessory has a main body portion 64 with four docking stations 66, 68, 70 and 72. The docking stations 66 and 68 are raised with respect to docking stations 70 and 72 so that the displays of the devices will be visible when all four stations are in use. Like the embodiment of FIG. 1, each docking station has a connector 78 that is adapted to physically and electrically connect a portable electronic device to the main body portion 64. The main body portion 64 contains voltage conditioning circuitry that receives electrical power through a household plug 74 and cable 76 and converts the electrical power into the voltage and current required by the devices for which the connectors 74 in the docking stations 66, 68, 70 and 72 are designed.

Adapters 80 and 82 can be snapped into the docking stations 66, 68, 70 and 72 to configure the stations to receive a different type of portable electronic device. In the embodiment of FIG. 4, each adapter has a connector 81 that couples with the connector 78 in the docking station. The adapter dock connector 81 is electrically connected to an adapter output connector 83 that is configured to couple to a different type of portable electronic device than the docking station connector 78. The adapters 80 and 82 allow a user to customize the accessory to accept the particular type of devices that they need to charge. These adapters can be used to provide alternative voltages for different devices by altering the voltage output that is electrically connected to the charging contact of the adapter output 83. This can be accomplished through simply selecting different pins or altering the output voltage with a resistor, transformer, etc. that is contained with the adapter 80 or 82. Like the adapters shown in FIG. 1, the housing 85 of the adapters 80 and 82 is configured to support the type of device for which the adapter is designed.

Although there have been described particular embodiments of the present invention of a new and useful MULTIPLE DEVICE CHARGING STATION WITH USER FRIENDLY CONFIGURABLE MOUNT, it is not intended that such references be construed as limitations upon the scope of this invention except as set forth in the following claims.

What is claimed is:

1. A charger for charging a plurality of electronic devices, said charger comprising:
    at least two docks wherein each dock has a docking cavity adapted to receive a first type of portable electronic device having a display and user controls such that an electrical connector in the docking cavity is electrically coupled to an electrical connector of the portable electronic devices and a rechargeable power supply of the device is charged while the device is supported so that the display can be viewed and the user controls accessed;
    a rechargeable power supply that is charged when said charger is connected to an external power supply such that said charger can be used to charge said plurality of electronic devices when the charger is not connected to an external power supply; and
    at least one dock adapter dimensioned to fit entirely in said docking cavity that alters an internal dimension of the docking cavity such that the docking cavity can support a second portable electronic device having different dimensions than the first portable electronic device.

2. The charger of claim 1 wherein said dock adapter further comprises an input connector that can be coupled to the connector in the docking cavity and an output connector that is adapted to connect to a different type of connector than the input connector.

3. The charger of claim 2 wherein the dock adapter includes a voltage converter for converting a first DC voltage to a second DC voltage.

4. The charger of claim 1 further comprising an FM transmitter for receiving an output signal from a device coupled to one of the docks and producing an FM broadcast signal based upon the output signal.

5. The charger of claim 4 further comprising a display for displaying a transmit frequency of said FM transmitter and user inputs that allow a user to alter the transmit frequency.

6. A charging dock for charging at least two portable electronic devices, said charging dock comprising:
    two docking stations wherein each station has a docking cavity that is adapted to mount and hold a portable electronic device in an upright position such that a display of the device is visible while the charging dock is charging a power supply of the device;
    a rechargeable battery that is charged when said charging dock is connected to an external power supply such that said charging dock can be used to charge a device when the charging dock is not connected to the external power supply; and
    at least one insert dimensioned to be positioned entirely inside one of said docking cavities that alters an interior dimension of the docking cavity to configure the docking cavity to support a different size of portable electronic device.

7. The charging dock of claim 6 wherein said insert further comprises a first connector for electrically connecting to a connector in the docking cavity and a second connector for electrically connecting to a different type of device than the connector in the docking cavity.

8. The charging dock of claim 6 wherein the insert further comprises a unitary piece of plastic.

9. The charging dock of claim 6 further comprising two more docking stations wherein said four docking stations are arranged in a square.

10. The charging dock of claim 6 further comprising an FM transmitter.

11. The charging dock of claim 6 wherein each docking station has a 30 pin connector.

12. The charging dock of claim 6 wherein said portable electronic device is a digital media player.

13. A charging dock for simultaneously charging at least two portable electronic devices, said charging dock comprising:
    a wall outlet plug for receiving an AC wall voltage;
    a converter for converting the AC wall voltage to a DC voltage;
    a first docking station having a cavity with an electrical connector positioned therein for receiving a portable electronic device such that a power supply of the device can be charged wherein the cavity is dimensioned to support a first type of portable electronic device having a display and a user control such that the display is visible and the control is accessible when the device is supported in the cavity;
    a second docking station having a cavity with an electrical connector positioned therein for receiving a portable electronic device such that a power supply of the device can be charged wherein the cavity is dimensioned to support a portable electronic device having a display and a user control such that the display is visible and the control is accessible when the device is supported in the cavity;
    a rechargeable battery that is charged when said charging dock is connected to an external power supply such that said charging dock can be used to charge a device when the charging dock is not connected to the external power supply; and
    at least one adapter that can be entirely inserted into one of the two cavities to alter the dimensions of the cavity such that the cavity can support a second type of portable electronic device having a display and a user control such that the display is visible and the control is accessible when the device is supported in the cavity.

14. The charging dock of claim 13 wherein said adapter further comprises a first connector for electrically connecting to the connector in the cavity and a second connector for electrically connecting to a different type of device than the connector in the cavity.

15. The charging dock of claim 13 further comprising an FM broadcast transmitter for transmitting a broadcast signal based upon a signal received from device mounted in one of said docking stations.

16. The charging dock of claim 13 further comprising a current limiter.

* * * * *